(12) United States Patent
Mamba et al.

(10) Patent No.: US 8,681,134 B2
(45) Date of Patent: Mar. 25, 2014

(54) DISPLAY DEVICE

(75) Inventors: Norio Mamba, Kawasaki (JP); Tsutomu Furuhashi, Yokohama (JP); Toshiyuki Kumagai, Chigasaki (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1368 days.

(21) Appl. No.: 12/137,569

(22) Filed: Jun. 12, 2008

(65) Prior Publication Data

US 2009/0021670 A1    Jan. 22, 2009

(30) Foreign Application Priority Data

Jul. 19, 2007   (JP) .................................. 2007-188260

(51) Int. Cl.
*G09G 5/00*   (2006.01)
(52) U.S. Cl.
USPC ............................ 345/207; 345/102; 345/211

(58) Field of Classification Search
USPC .......................... 345/207, 101, 102, 204, 211
See application file for complete search history.

(56) References Cited

U.S. PATENT DOCUMENTS

| 2006/0061406 A1 | 3/2006 | Takatori |
| 2008/0122829 A1* | 5/2008 | Park ............................. 345/213 |

* cited by examiner

*Primary Examiner* — Jimmy H Nguyen
(74) *Attorney, Agent, or Firm* — Antonelli, Terry, Stout & Kraus, LLP.

(57) ABSTRACT

A TFT element for ambient light detection and a TFT element for temperature detection are connected in series. In a first period, a first switch element is off, and a second switch element is at a hi side, so that a threshold voltage of the TFT element for temperature detection is detected. In a second period, a first switch element is on, and a second switch element is at a low side, so that temperature is detected. In a third period, a first switch element is on, and a second switch element is at a hi side, so that ambient light is detected. An input voltage and a control voltage to each of the TFT elements are set by a voltage controller provided in a drive circuit based on the threshold voltage.

5 Claims, 8 Drawing Sheets

DISPLAY DEVICE

CLAIM OF PRIORITY

The present application claims priority from Japanese application serial no. 2007-188260 filed o Jul. 19, 2007, the content of which is hereby incorporated by reference into this application.

BACKGROUND OF THE INVENTION

1. Field of the Invention

The present invention relates to a display device that detects temperature of a display panel or ambient light around a display device to display a good image.

2. Description of the Related Art

A liquid crystal display device as one of display devices needs a temperature sensor for correcting fluctuation in characteristics of optical sensor due to temperature for practically using an optical sensor being required for backlight dimming. U.S. Pre-Grant Publication No. 2006/0061406 (JP-A-2006-71564) describes that two TFT elements (for temperature detection and for current-voltage conversion) are provided on a glass substrate, and temperature is taken as a voltage signal, and concurrently with this, a gate voltage (control voltage) of the current-voltage conversion TFT element is set to be at least three times larger than a threshold voltage Vth of the TFT element, thereby temperature is linearly converted into a voltage in order to control an overdrive circuit for improving backlight dimming control or a response characteristic of a liquid crystal.

SUMMARY OF THE INVENTION

A rate of output voltage to temperature (mV/K) in a usual temperature sensor is varied depending on a ratio of control voltage to threshold voltage. Here, in the case of detecting temperature, when the ratio of control voltage to threshold voltage is fixed, even if a control voltage is determined based on a typical threshold voltage Vth, when the threshold voltage Vth is varied during mass production, the ratio of control voltage to threshold voltage is still varied. Therefore, the rate of output voltage to temperature is also varied, and consequently temperature cannot be accurately measured.

Thus, an object of the invention is to detect a threshold voltage Vth of the temperature detection TFT element, and detects temperature and ambient light based on the threshold voltage Vth.

In the invention, two TFT elements are connected in series, and one TFT element is set to be for temperature detection, and the other TFT element is set to be for ambient light detection, and a threshold voltage Vth of the temperature detection TFT is detected.

The temperature can be accurately measured based on the threshold voltage Vth detected in this way. That is, since the overdrive circuit, which improves control of backlight dimming or a response characteristic of a liquid crystal, can be accurately controlled depending on variation in temperature of a display panel, an excellent image can be displayed by a display device. Moreover, since ambient light can be accurately measured based on the detected threshold voltage Vth, luminance or contrast of a display image can be accurately controlled depending on ambient light around the display device.

According to the invention, the following advantages of (1) to (4) are exhibited.

(1) Since the threshold voltage Vth of a TFT element to be used as a sensor can be measured, a gate voltage (control voltage) of the TFT element can be set by a ratio of control voltage to threshold voltage, consequently temperature can be accurately detected.

(2) An integration type circuit is used as a digital conversion circuit that converts a drain current for measuring the threshold voltage Vth into a digital signal, and a double-integration type circuit is used as a digital conversion circuit that converts a voltage depending on temperature into a digital signal, thereby two types of digital conversion can be performed without increasing the number of circuits, and therefore cost reduction is achieved.

(3) Two types of characteristics of temperature and ambient light can be measured only by controlling a control signal for each TFT element in two TFT elements connected in series, not only temperature but also ambient light can be detected without providing an additional sensor.

(4) When ambient light is detected by a TFT element used as a sensor, temperature can be detected at the same time, therefore fluctuation in ambient light detection characteristic due to temperature can be corrected.

DESCRIPTION OF THE PREFERRED EMBODIMENT

Hereinafter, examples of the invention are described using drawings.

Example 1

Figure 1:
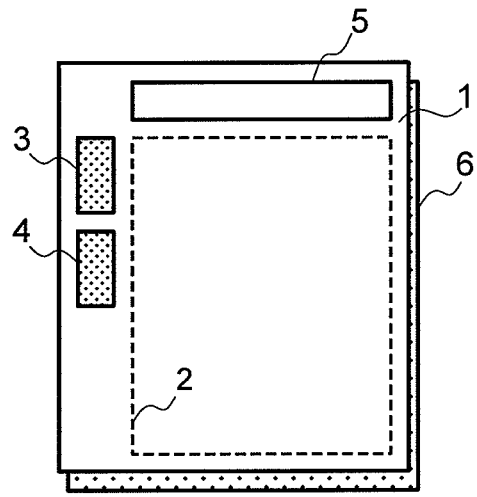
FIG. 1 shows a general configuration diagram of a display device according to the invention.

FIG. 1 shows a schematic diagram of a display device of this example. In FIG. 1, a plurality of pixels are arranged in a matrix pattern in a display area 2 of a display panel 1. In the periphery of the display area 2, a current-voltage converter 3 that linearly converts a temperature to output characteristic when temperature of the display panel 1 is detected, and a temperature detector 4 that detects temperature of the display panel 1 are disposed. Size (width W and length L) of the current-voltage converter 3 is set to be approximately the same as that of the temperature detector 4. A drive circuit 5 disposed in the periphery of the display area 2 generates a control signal for controlling each of the current-voltage converter 3 and the temperature detector 4, and a drive signal for driving the pixels in the display area 2.

Figure 2:
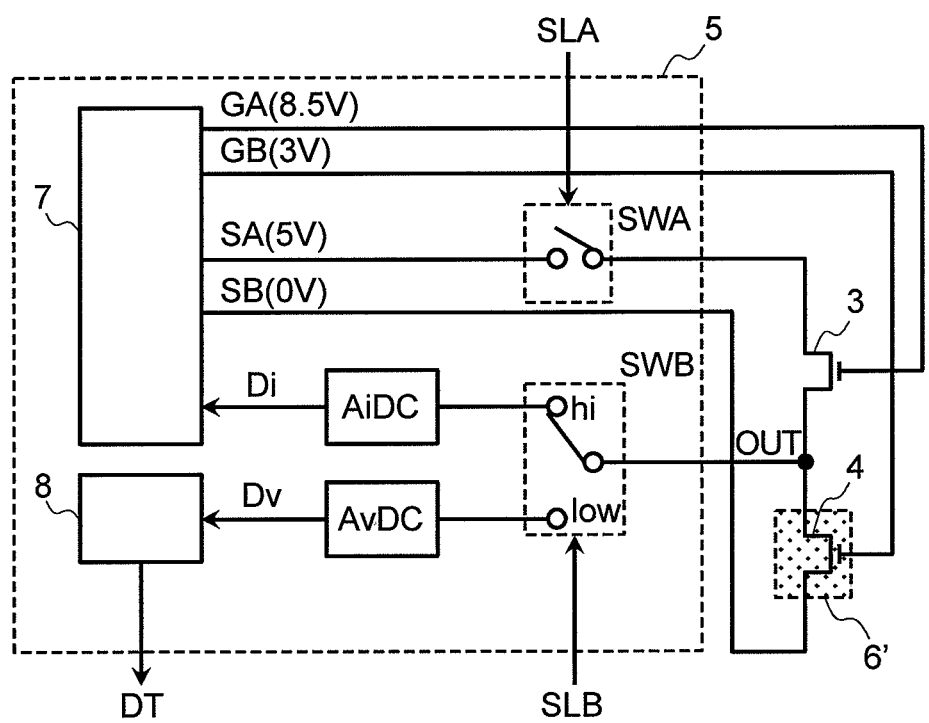
FIG. 2 shows a circuit configuration diagram of a current-voltage converter 3 and a temperature detector 4 as shown in FIG. 1.

FIG. 2 is a circuit configuration diagram of the current-voltage converter 3 and the temperature detector 4 as shown in FIG. 1. In FIG. 2, the current-voltage converter 3 and the temperature detector 4 are configured by two TFT elements connected in series, and hereinafter they may be called TFT element 3 and TFT element 4 respectively. In the TFT element 4, a shade 6' for shading ambient light is provided. While not shown, each TFT element is designed so as to be not affected by light from a backlight 6 shown in FIG. 1. For example, aback of the display panel 1 is shaded, or a TFT element for driving pixels in the display area 2 is designed to have a bottom gate structure. Other circuits than the TFT elements 3 and 4 are incorporated in the drive circuit 5. However, the circuits may not be incorporated in the drive circuit 5, but may be discretely configured in the outside.

First, to detect a threshold voltage Vth of the TFT element 4, a switch element SWA is turned off by a control signal SLA so that the TFT element 3 is opened, and a terminal being connected to SB of the TFT element 4 is applied with a voltage VSB_d for measuring a drain current so that the drain current is measured. In the case of measuring the current, a changeover switch element SWB is changed to a hi side by a control signal SLB so that an output signal OUT from the TFT element 4 is connected to a current-digital conversion circuit AiDC. The current-digital conversion circuit AiDC converts an analog current into a digital signal.

Next, when temperature is detected by the TFT element 4, the switch element SWA is turned on by a control signal SLA, and the changeover switch element SWB is changed to a low side by the control signal SLB so that the output signal OUT from the TFT element 4 is connected to a voltage-digital conversion circuit AvDC. The voltage-digital conversion circuit AvDC converts an analog voltage into a digital signal.

Finally, a voltage controller 7 outputs control signals GA and GB for measuring temperature to gates of the TFT elements 3 and 4 respectively based on the threshold voltage Vth obtained by measuring the drain current of the TFT element 4, so that temperature is detected. In addition to this, the voltage controller 7 generates input signals SA and SB and outputs the signals into the TFT elements 3 and 4 respectively, and while not shown, generates a reference voltage VREF and outputs the reference voltage to the digital conversion circuits AiDC and AvDC respectively. A temperature signal generator 8 performs correction processing of a digital signal Dv and converts the signal into a temperature signal DT.

Figure 3:
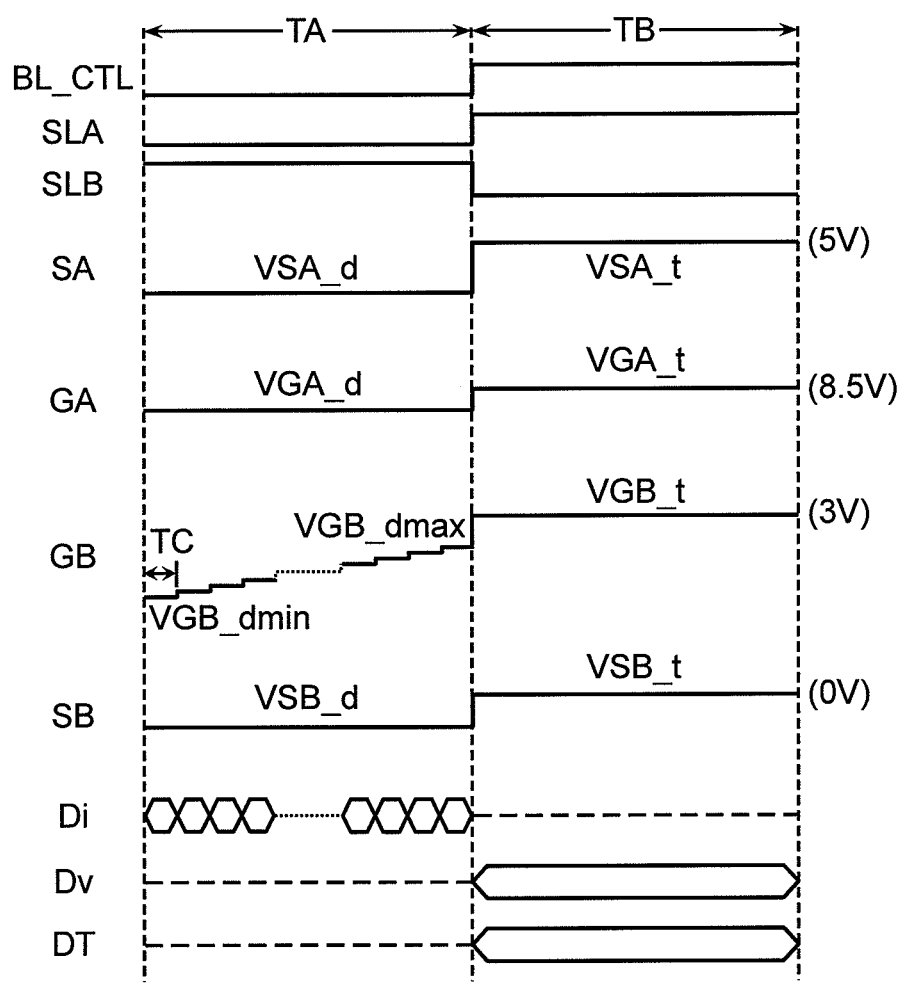
FIG. 3 shows a timing chart of operation of each of TFT elements 3 and 4 shown in FIG. 2.

FIG. 3 shows a timing chart of the above operation. In FIG. 3, a period during which the threshold voltage Vth of the TFT element 4 is measured is shown as TA, and a period during which temperature is measured is shown as TB.

In the period TA, the control signals SLA and SLB to be supplied to the switch elements SWA and SWB respectively are as described before. A backlight control signal BL_CTL is used to turn off the backlight when the threshold voltage Vth is measured. If backlight shading works well as described before, this operation is not necessary. Since the TFT element 3 is open in the period TA, the voltage VSA_d of the input signal SA and the voltage VGA_d of the control signal GA to the TFT element 3 may not be particularly defined.

On the other hand, the voltage VSB_d of the input signal SB for the TFT element 4 in the period TA is set so as to be corresponding to a drain-source voltage Vds for measuring the threshold voltage Vth of the TFT element 4. When the current-digital conversion circuit AiDC is an integration type circuit, the drain-source voltage Vds can be adjusted by using a difference from the reference voltage. The voltage VGB_d of the control signal GB for the TFT element 4 is changed with a step of a period TC in a range including fluctuation in threshold voltage Vth of the TFT element 4 (for example, a range from VGB_dmax to VGB_dmin), so that a drain current (OUT: Di) is sequentially measured.

In this way, ambient light is shaded by the shade, and furthermore, an effect of backlight is eliminated. Therefore, the threshold voltage Vth of the TFT element 4 can be detected through measurement of a drain current of the TFT element while eliminating influence of a photoconductive current.

Next, when temperature is measured in the period TB, the control signals SLA and SLB to be supplied to the switch elements SWA and SWB respectively are as described before. When temperature is measured, voltages VGA_t and VGB_t of the control signals GA and GB to be supplied to the TFT elements 3 and 4 respectively are set based on the threshold voltage Vth measured in the period TA. Here, VGA_t is set such that a ratio of control voltage to threshold voltage is 3 or more as described in U.S. Pre-Grant Publication No. 2006/0061406 (JP-A-2006-71564). VGB_t is set such that the TFT element 4 is on so that change of the drain current to temperature is increased.

For example, when voltages VSA_t and VSB_t of the input signals SA and SB to the TFT elements 3 and 4 are set to be 5 V and 0 V respectively, and the ratio of control voltage to threshold voltage is set to be 3.5, in the case that a detected threshold voltage Vth is 1.0 V, VGA_t is set to be 8.5 V being 3.5 V (1.0 V×3.5) higher than the VSA_t (5V). When a threshold voltage Vth detected in another display device is 1.4 V, assuming that the ratio of control voltage to threshold voltage is 3.5, VGA_t is set to be 9.9 V. When the voltage VGB_t of the control signal GB to the TFT element 4 is set to be, for example, a voltage being higher by certain potential (for example, 2V) compared with the threshold voltage Vth, the voltage VGB_t is 3 V in the former case (Vth=1.0 V), and 3.4 V in the latter case (Vth=1.4 V).

In this way, in any display device, since the control voltage (VGA_t or VGB_t) can be set based on a threshold voltage of a TFT element incorporated within the device, a rate of output voltage to temperature is fixed, and consequently temperature can be accurately detected. Moreover, an output signal (OUT: Dv) that changes in proportion to temperature can be obtained.

Figure 4:
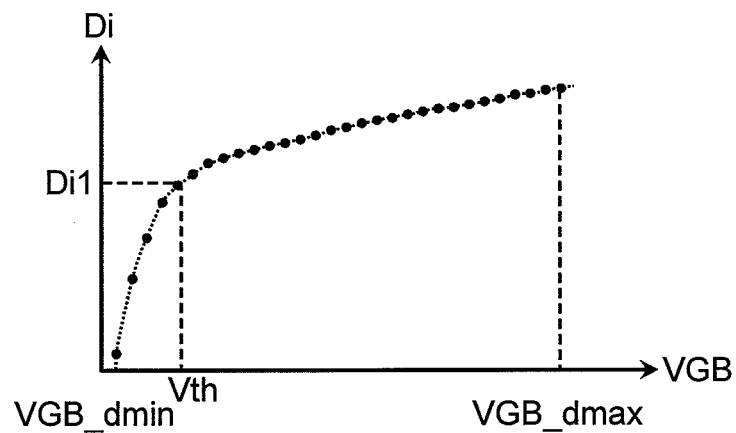
FIG. 4 shows a graph for obtaining a threshold voltage Vth in a period TA shown in FIG. 3.

FIG. 4 shows a schematic diagram of measurement results of a drain current Di of the TFT element 4 and a control voltage VGB thereto in the period TA shown in FIG. 3. In FIG. 4, when a drain current at the threshold voltage Vth is assumed to be Di1 (drain-source voltage Vds), a voltage at which the drain current corresponds to Di1 is the threshold voltage Vth, the voltage being obtained as a result of changing the control voltage VGB_d. The voltage controller 7 shown in FIG. 2 changes the control voltage VGB (gate voltage of the TFT element 4) within the above range in the period TA, and stores a drain current Di at each voltage, thereby the controller can detects the threshold voltage Vth. While not shown, the voltage controller 7 may gradually change the control voltage VGB, and store a voltage VGB, at which the drain current corresponds to Di1, as the threshold voltage Vth, and may stop scan of the control voltage VGB at the same time. The drain current Di1 is a predetermined value.

Figure 5:
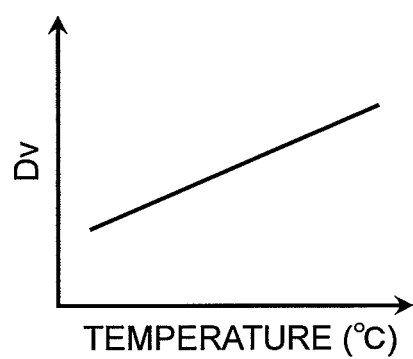
FIG. 5 shows a graph for obtaining a temperature detection signal Dv being linear in a period TB shown in FIG. 3.

FIG. 5 shows an aspect that an output signal Dv being linear with respect to temperature is obtained in the period TB according to the above setting.

Example 2

In this example, the two digital conversion circuits (AiDC and AvDC) used in the example 1 is configured by one digital conversion circuit (AviDC). Thus, since the number of circuits is decreased, the threshold voltage Vth can be detected at low cost.

Figure 6:
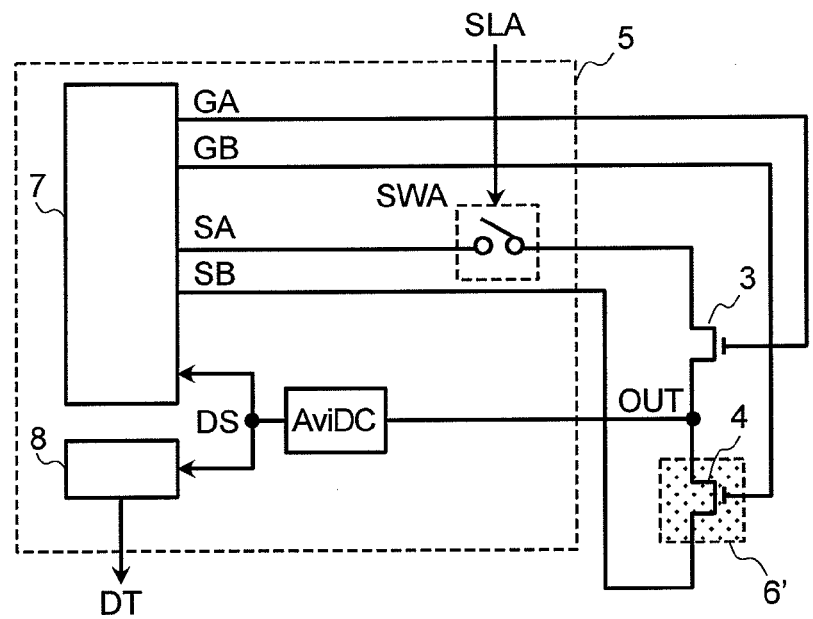
FIG. 6 shows a circuit configuration diagram of example 2 showing the current-voltage converter 3 and the temperature detector 4 as shown in FIG. 1.

FIG. 6 shows a circuit configuration diagram of the current-voltage converter 3 and the temperature detector 4 as shown in FIG. 1. In FIG. 6, a current and voltage-digital conversion circuit AviDC is formed by integrating the current-digital conversion circuit AiDC and the voltage-digital conversion circuit AvDC as shown in FIG. 2 into one unit. As a result, the changeover switch element SWB shown in FIG. 2 is unnecessary.

Figure 7:
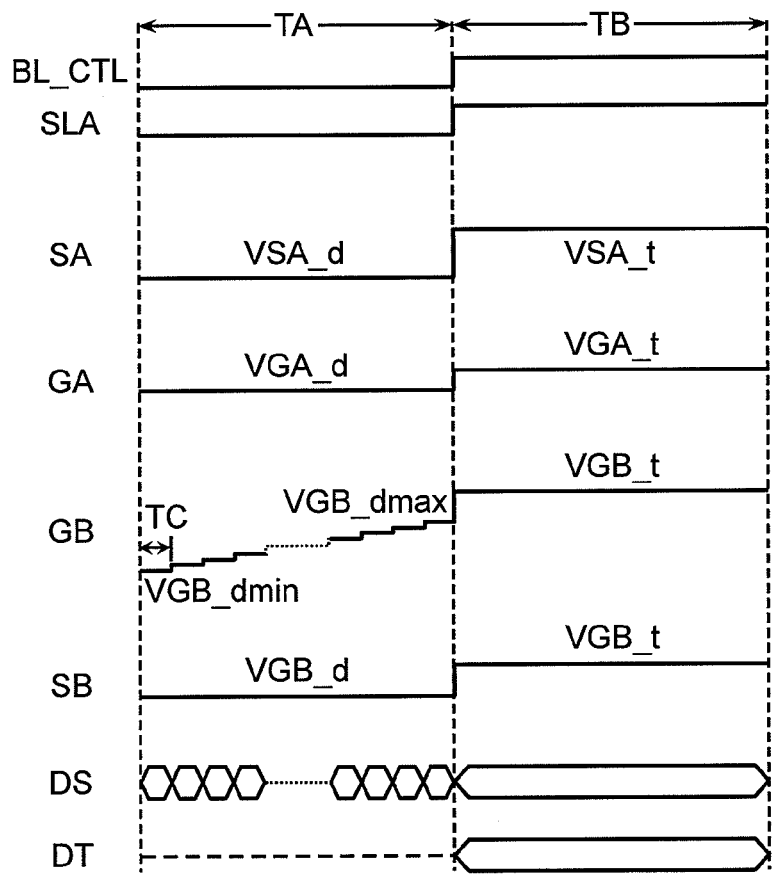
FIG. 7 shows a timing chart of operation of each of TFT elements 3 and 4 shown in FIG. 6.

FIG. 7 is a timing chart for illustrating operation of the circuit of FIG. 6. Operation of the circuit is similar to operation of the circuit of FIG. 3, but different in that the current and voltage-digital conversion circuit AviDC performs digital conversion of a drain current in the period TA, and performs digital conversion of a detected voltage in the period TB, so that the circuit AviDC outputs converted output DS.

Figure 8:
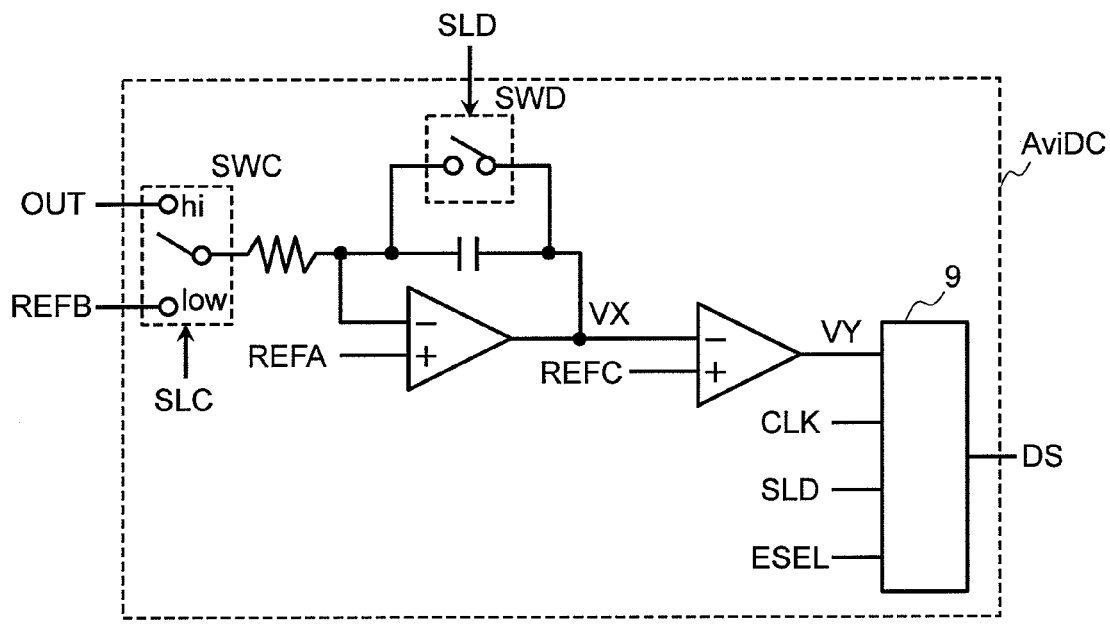
FIG. 8 shows a circuit configuration diagram of a current and voltage-digital conversion circuit AviDC as shown in FIG. 6.

FIG. 8 shows a circuit configuration diagram of the current and voltage-digital conversion circuit AviDC as shown in FIG. 6. In FIG. 8, the current and voltage-digital conversion circuit AviDC is configured by an integrating circuit including a changeover switch element SWC and an operational amplifier having a capacitor, a switch element SWD for resetting the integrating circuit, a comparator including an operational amplifier, and a counter 9. Respective reference voltages REFA, REFB and REFC are supplied from the voltage controller 7.

VX shows an output signal from the integrating circuit, VY shows an output signal from the comparator, CLK shows a clock for a counter 10, SLD shows a reset signal (resetting at Hi), and ESEL shows an enable-signal polarity selection signal.

Figure 9:
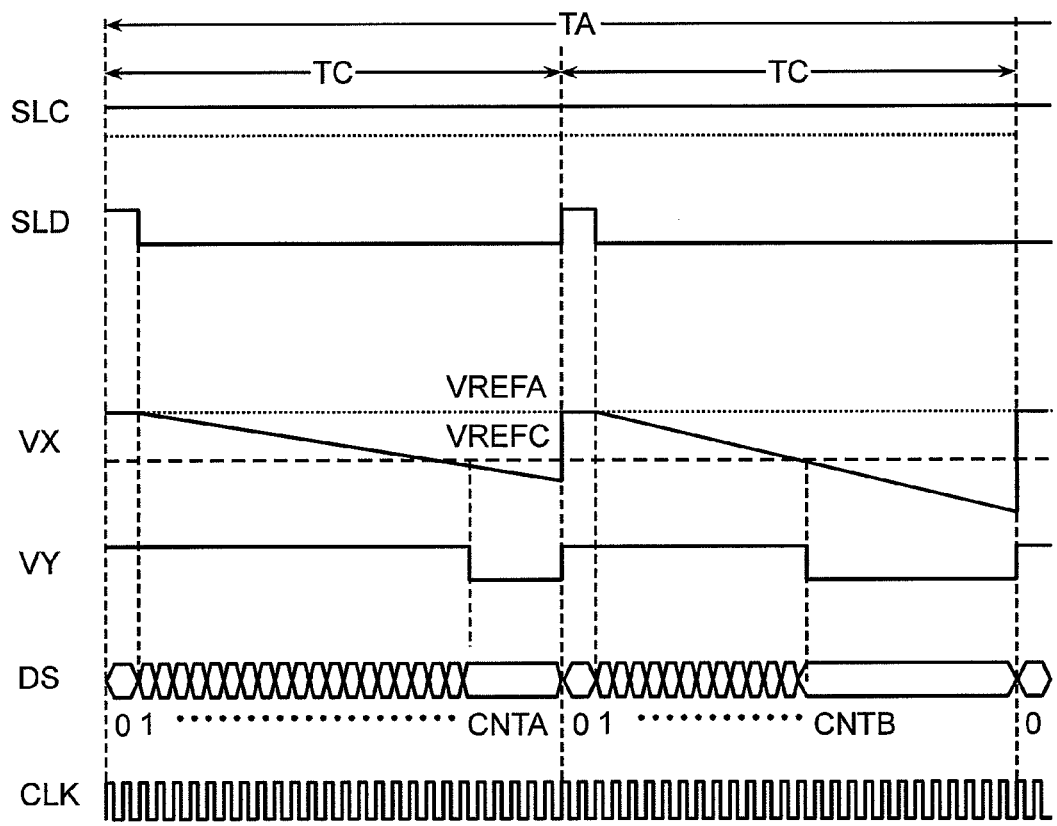
FIG. 9 shows a timing chart in the case that the current and voltage-digital conversion circuit AviDC shown in FIG. 8 performs digital conversion of a drain current.
Figure 10:
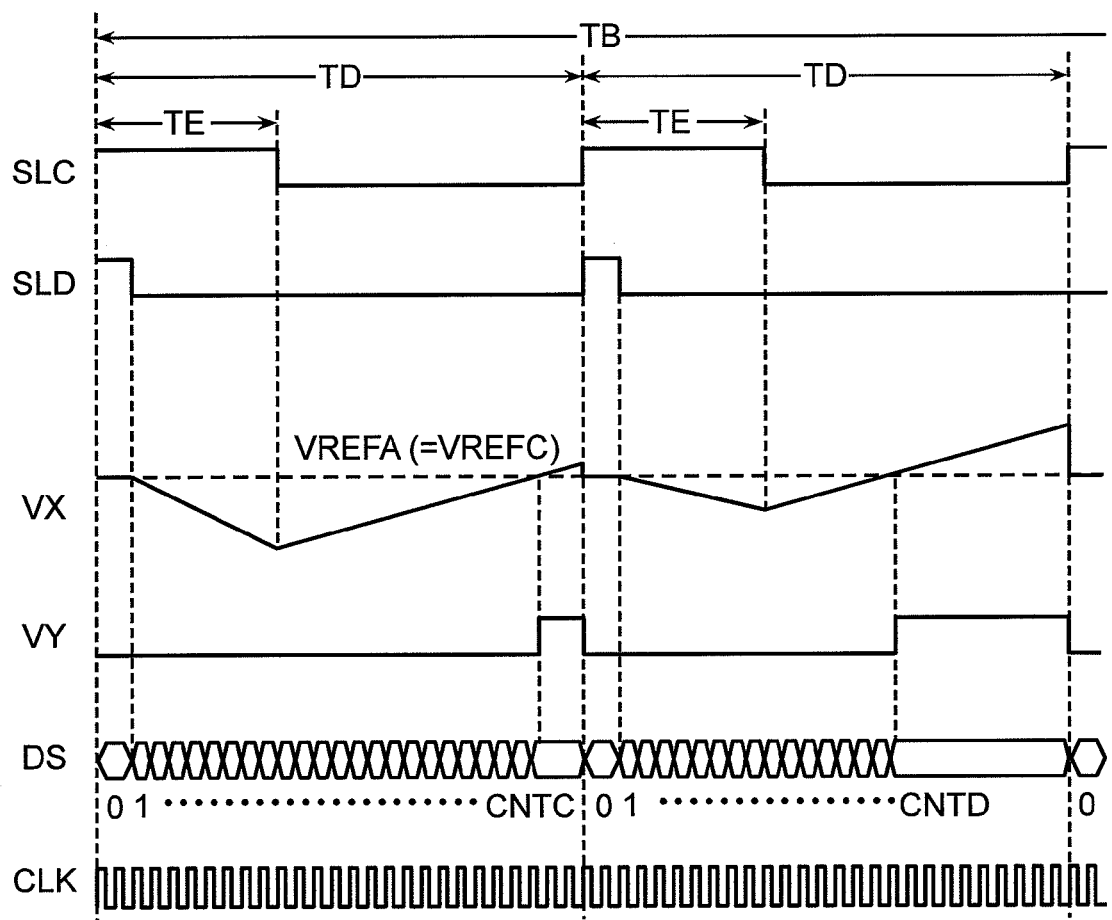
FIG. 10 shows a timing chart in the case that the current and voltage-digital conversion circuit AviDC shown in FIG. 8 performs digital conversion of a detected voltage.

In the counter 9, polarity of an enable signal is selected according to ESEL, and when ESEL is Hi, the counter counts the clock in a period when VY is Hi, and when ESEL is low, the counter counts the clock in a period when VY is low. Accordingly, as shown in FIG. 9, when ESEL is Hi, the counter 9 uses the output signal VY from the comparator as an enable signal, and starts count of the clock CLK when the VY is Hi. As shown in FIG. 10, when ESEL is Low, the counter 9 uses the output signal VY from the comparator as an enable signal, and starts count of the clock CLK when the VY is low.

FIG. 9 shows a timing chart when the current and voltage-digital conversion circuit AviDC as shown in FIG. 8 performs digital conversion of a drain current. In FIG. 9, when a reset signal SLD is Hi, output VX from the integrating circuit is reset to be a reference voltage VREFA, and concurrently with this, the counter 9 is reset to be 0.

Since the switch element SWC is connected to output OUT of the TFT element 4, after the output VX is reset, a current from the output OUT is inputted into the integrating circuit, and thereby output VX of the integrating circuit is varied. For example, in the period TA, as described FIGS. 2 and 3, the output VX of the integrating circuit is varied depending on a drain current flowing through the TFT element 4 due to a source-drain voltage Vds of the TFT element 4 determined by the source voltage VSB_d of the TFT element 4 and the reference voltage VREFA, and the control voltage VGB_d to the TFT element 4.

Here, a reference voltage VREFC of the comparator is fixed to be a potential lower than a reference voltage VREFA of the integrating circuit. Thus, when the drain current is increased, the slope of the output VX of the integrating circuit is increased, and consequently time before the output VX intersects with the reference voltage VREFC of the comparator is shortened. On the other hand, when the current is decreased, the slope of the output VX of the integrating circuit is decreased, and consequently time before the output VX intersects with the reference voltage VREFC of the comparator is lengthened. Thus, since a count value of the counter 9 is changed depending on a current, the current can be detected. A left period TC shown in FIG. 9 corresponds to a case of small drain current, and a right period TC corresponds to a case of large drain current.

FIG. 10 shows a timing chart in the case that the current and voltage-digital conversion circuit AviDC as shown in FIG. 8 performs digital conversion of the detected voltage. In FIG. 10, a period TD is a period during which the detected voltage is measured (that is, a period during which temperature is measured). A period TE is a certain period during which the output voltage OUT of the TFT element 4 is detected.

In the period TE, the integrating circuit is connected to the output OUT of the TFT element 4 by the switch element SWC shown in FIG. 8, and thus a current flowing through the integrating circuit is changed depending on a voltage value of the output OUT, so that the slope of the output VX of the integrating circuit is changed.

For example, when the output OUT of the TFT element 4 is large in a period TE shown at the left in FIG. 10, since a current value determined by a difference between the output OUT and the reference voltage VREFA of the integrating circuit is also large, the slope of the output VX of the integrating circuit is increased. Thus, a potential difference to be reached by the output VX of the integrating circuit in the period TE is increased, and consequently a potential becomes low. On the other hand, when the output OUT of the TFT element 4 is small in a period TE shown at the right, since a current value determined by a difference between the output OUT and the reference voltage VREFA of the integrating circuit is also small, the slope of the output VX of the integrating circuit is decreased. Thus, a potential difference to be reached by the output VX of the integrating circuit in the period TE is decreased, and consequently a potential becomes high. Here, for example, OUT≥VREFA is set.

After the period TE, the reference voltage REFB is connected to the integrating circuit by the switch element SWC. Here, for example, VREFB<VREFA is set. Since a certain reference voltage VREFB is inputted into the integrating circuit, a slope of the output VX of the integrating circuit becomes constant after the period TE. A period before the output VX of the integrating circuit corresponds to the reference voltage VREFC of the comparator (for example, the voltage VREFC being set to be the same potential as VREFA) depends on the potential to be reached by the output VX in the terminal TE.

For example, when the voltage to be reached is low in the period TE shown at the left in FIG. 10, a counting period is lengthened (count value is increased). On the other hand, when the voltage to be reached is high in the period TE shown at the right, the counting period is shortened (count value is decreased). In this way, the detected voltage can be measured while being subjected to digital conversion.

Example 3

Figure 11:
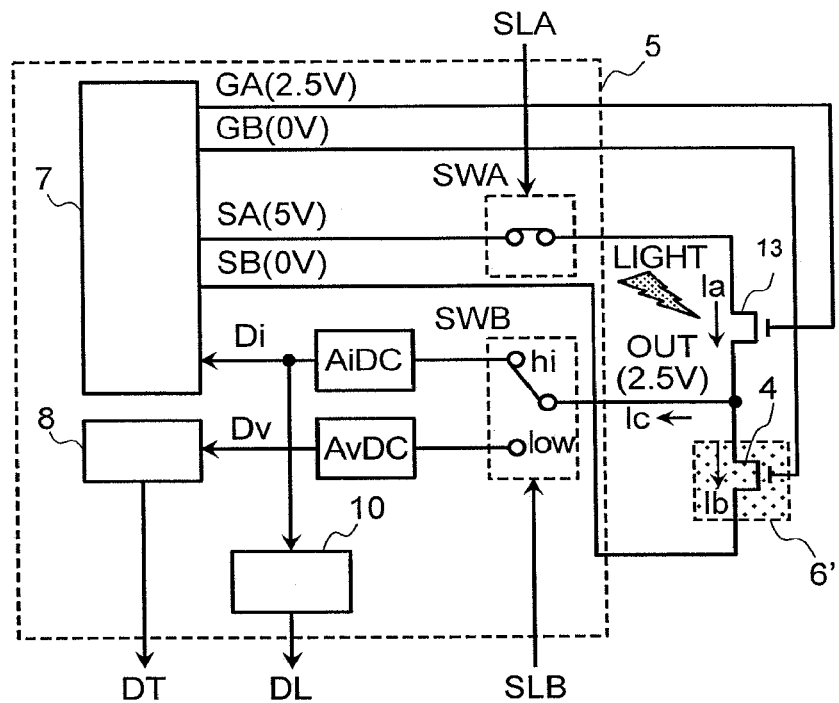
FIG. 11 shows a circuit configuration diagram of example 3 showing a TFT element 3 that detects ambient light and a TFT element 4 that detects temperature.

In this example, the TFT elements 13 and 4 are used to detect ambient light around a display device, and detect temperature of the display device. FIG. 11 shows a circuit configuration diagram of a TFT element 13 that detects ambient light and a TFT element 4 that detects temperature. The TFT element 13 can be a TFT similar to the element 3 as shown in FIG. 2 or 6 configured to be used to detect ambient light.

FIG. 11 is different from FIG. 2 in that an ambient light signal generator 10 is provided. When ambient light is detected, a switch element SWA is turned on. Moreover, a changeover switch element SWB is changed to a side of a current-digital conversion circuit AiDC in order to detect a signal, which is changed depending on ambient light, as a current from the TFT element 13. In this way, since an output signal Di outputted from the current-digital conversion circuit AiDC is a digital signal that varies in conjunction with ambient light, the output signal is subjected to correction processing by the ambient light signal generator 10, and then outputted as an ambient light signal DL. To detect the ambient light, the TFT elements 13 and 4 are used in an OFF region respectively.

Figure 12:
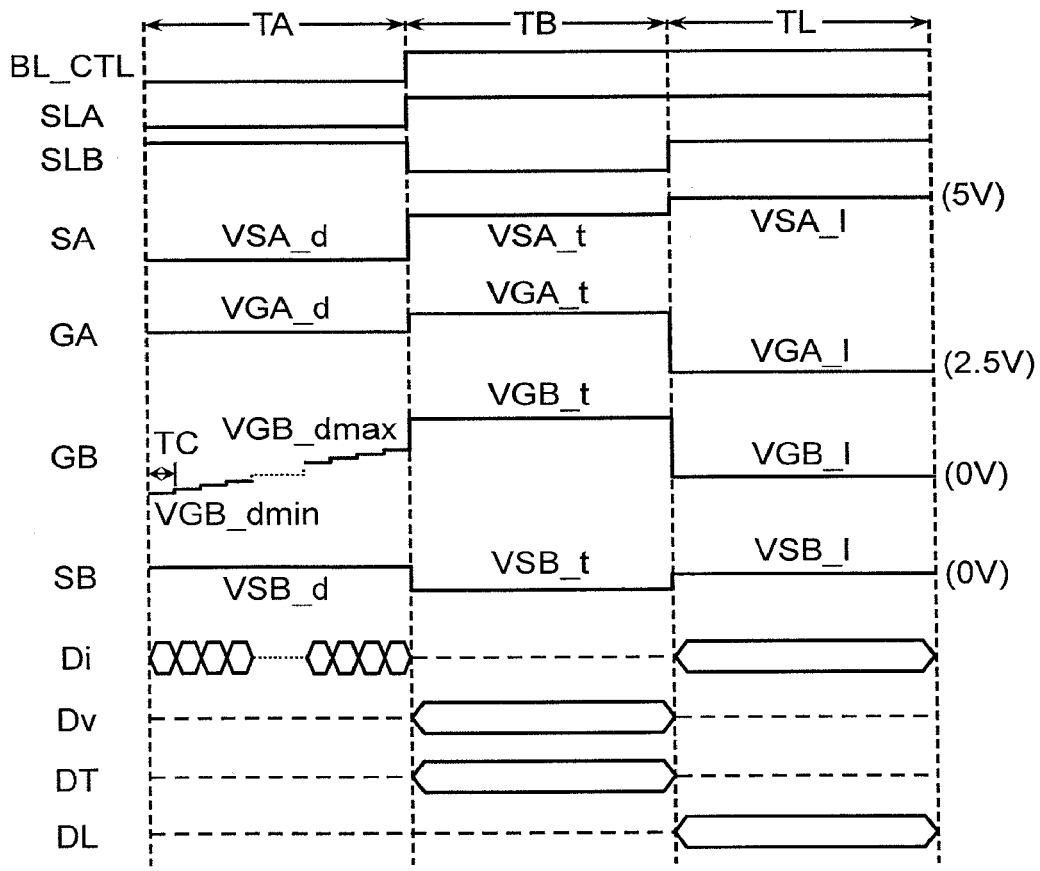
FIG. 12 shows a timing chart for illustrating operation of each of the TFT element 3 that detects ambient light and the TFT element 4 that detects temperature as shown in FIG. 11.

In a period TL during which ambient light is detected as shown in FIG. 12, an example of setting a voltage to each of the TFT elements 13 and 4 is as follows. For example, when a voltage VSA_1 of an input signal SA is 5 V, and a voltage VSB_1 of an input signal SB is 0 V, a reference voltage VREFA of the current-digital conversion circuit AiDC (in the case that the current-digital conversion circuit AiDC is an integration type circuit as shown in FIG. 8) is set such that a potential of the output OUT is near the middle (2.5 V) between VSA_1 and VSB_1. Here, a source-drain voltages Vds of the TFT element 13 is approximately equal to that of the TFT element 4, and Vds=(VSA_1−VSB_1)/2 is given.

Moreover, a voltage VGA_1 of a control signal GA is set such that the TFT element 13 is off. Here, for example, VGA_1=2.5 V is set. Similarly, a voltage VGB_1 of a control signal GB is set such that the TFT element 4 is off. Here, for example, VGB_1=0 V is set.

Ambient light detection is performed according to the following principle. When the ambient light is not irradiated to the TFT element 13, since a drain current Ia through the TFT element 13 is approximately equal to a drain current Ib through the TFT element 4 being shaded from the ambient light, an output current Ic does not flow. On the other hand, once the ambient light begins to be irradiated to the TFT element 13, an off current (Ia) through the TFT element 13 is increased with increase in intensity of ambient light, since the drain current 1b of the TFT element 4 does not change, a difference between the currents (Ia−Ib) corresponds to the output current Ic. In this way, output OUT=Ic is given, and the signal that is varied depending on intensity of ambient light is subjected to digital conversion, so that the ambient light can be detected.

FIG. 12 shows a timing chart for illustrating operation of each of the TFT element 13 that detects ambient light and the TFT element 4 that detects temperature as shown in FIG. 11. In FIG. 12, operation in the period TA during which the threshold voltage Vth is detected, and operation in the period TB during which temperature is detected are as described in the examples 1 and 2. In this example, in a period TL during which ambient light is detected, the control signals SLA and SLB, which control the switch elements SWA and SWB respectively, turn on the switch element SWA, and changes the changeover switch element SWB to the side of the current-digital conversion circuit AiDC, as described before. In the period TL, setting of various voltages (VSA_1, VSB_1, VGA_1 and VGB_1) is performed as described with FIG. 11. In the period TL, an output signal Di from the current-digital conversion circuit AiDC becomes a digital signal varying in conjunction with ambient light, and the digital signal is formed into an ambient light signal DL by the ambient light signal generator 10.

Example 4

Figure 13:
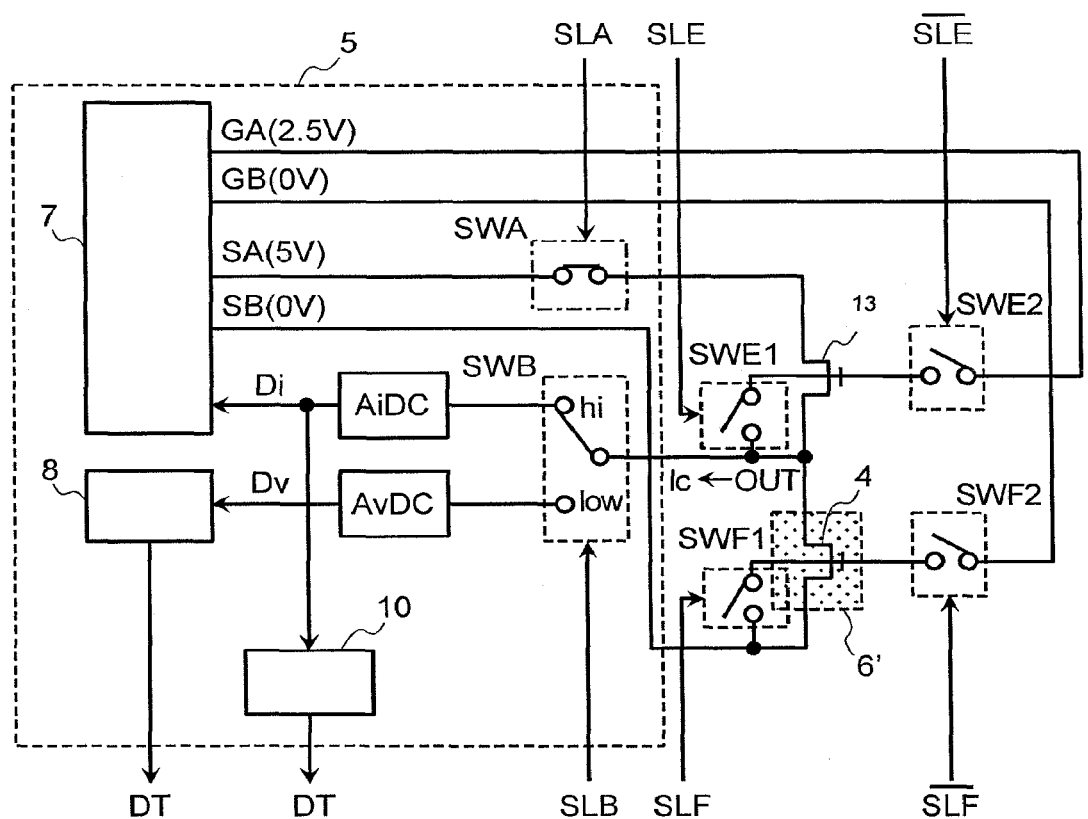
FIG. 13 shows a circuit configuration diagram of example 4.

FIG. 13 shows a circuit configuration formed by modifying the circuit configuration of the example 3 as shown in FIG. 11. The circuit configuration of this example additionally has switch elements SWE1 and SWF1 that make the TFT elements 13 and 4 to be in diode connection, and switch elements SWE2 and SWF2 that make control signals GA and GB to be open.

The switch elements SWE1 and SWE2 are controlled by a control signal SLE, and when the control signal SLE is Hi, the switch element SWE1 is on, and switch element SWE2 is off. On the other hand, when the control signal SLE1 is Low, the switch element SWE1 is off, and switch element SWE2 is on. The switch elements SWF1 and SWF2 are similarly controlled by a control signal SLF.

In the case of the period TA during which the threshold voltage Vth is measured or the period TB during which temperature is detected as described heretofore, each of the control signals SLE and SLF is set to be Low, thereby the same connection condition as in the circuit configuration as shown in FIG. 2 is made. In the case of the ambient light detection period TL, each of the control signals SLE and SLF is set to be Hi, thereby the TFT elements 13 and 4 are made to be in diode connection.

Here, for example, VSA_1 is set to be 5 V, VSB_1 is set to be 0 V, and VREFA_1 is set to be 2.5 V as in the example 3, thereby voltages to be applied to the TFT elements in diode connection are equal to each other. Therefore, a differential current Ic in the diode connection is changed in conjunction with ambient light. Thus, ambient light can be detected as in the example 3.

Moreover, since ambient light and temperature can be detected respectively, temperature dependence of characteristics of an ambient light sensor or temperature dependence of characteristics of a temperature sensor can be corrected.

A circuit configuration for detecting ambient light has been described based on the circuit configuration shown in FIG. 2. However, even if a configuration of a digital conversion circuit is configured as shown in FIG. 6, if a current is detected in the period TL, the same effect is obtained.

While the switch element SWA is used to turn off the input signal SA in FIGS. 2, 6 and 11, and furthermore, the switch elements SWA, SWE2 and SWF2 are used to turn off the input signal SA and control signals GA and GB respectively in FIG. 13, if the voltage controller 7 can set each of the input signal and the control signals to have high impedance at an appropriate timing, a circuit configuration in which these switch elements are omitted may be used.

What is claimed is:
1. A display device, comprising:
a display panel on which a plurality of pixels are arranged in a matrix pattern,
a current-voltage converter and a temperature detector disposed in the periphery of the display panel, and a drive circuit configured to supply a first control signal to the current-voltage converter and a second control signal to the temperature detector, respectively, and drive signals to drive the pixels, wherein a voltage controller is provided in the drive circuit, and the voltage controller is configured to detect a threshold voltage of the temperature detector, and to set a first input voltage and a first control voltage to the current-voltage converter and to set a second input voltage and a second control voltage to the temperature detector, respectively, based on the threshold voltage, wherein the voltage controller detects the threshold voltage of the temperature detector while making the current-voltage converter to be open.

2. The display device according to claim 1:

wherein a shade for shading ambient light is provided in the temperature detector.

3. The display device according to claim 1:

wherein a TFT element of the current-voltage converter and a TFT element of the temperature detector are connected in series.

4. The display device according to claim 1:

wherein a digital conversion circuit that performs digital conversion of output of each of the current-voltage converter and the temperature detector is provided in the drive circuit.

5. The display device according to claim 4:

wherein the digital conversion circuit includes:

a current-digital conversion circuit that performs digital conversion of an output current from the temperature detector, and a voltage-digital conversion circuit that performs digital conversion of an output voltage from the temperature detector.

* * * * *